United States Patent Office 2,992,703
Patented July 18, 1961

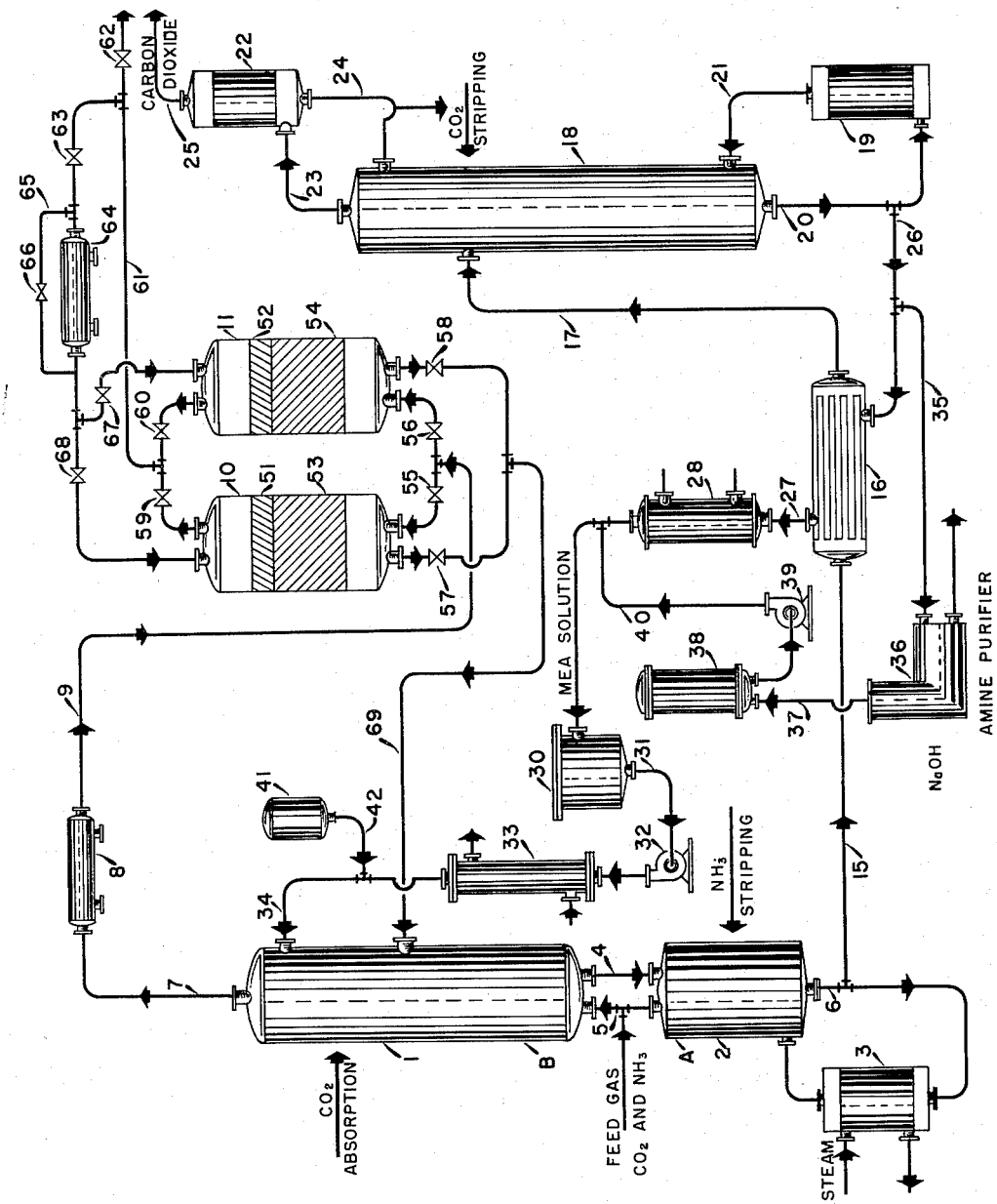

2,992,703
SEPARATION OF CARBON DIOXIDE FROM AMMONIA
Srini Vasan, Brooklyn, and Lucien H. Cook, Port Washington, N.Y.
Filed June 5, 1958, Ser. No. 739,997
6 Claims. (Cl. 183—114.2)

This invention relates to a method for treating gaseous mixtures containing both ammonia and carbon dioxide for the separation and separate recovery of these two materials. It is more particularly concerned with the final purification of the ammonia after the separation of ammonia and carbon dioxide to obtain an ammonia product which contains less than about 2 parts per million of carbon dioxide by volume.

Mixtures of carbon dioxide and ammonia, with or without other fixed gases and water vapor, are encountered in a number of industries. Thus, for example, such mixtures are found in coal gas and in the conversion of ammonium carbamate to urea. The process of this invention is particularly well adapted for the treatment of concentrated gas mixtures of the type encountered in urea manufacture and in the manufacture of melamine by heating urea, either alone or in the presence of anhydrous ammonia, since it accomplishes the rapid and substantially complete separation of the two gases and purification of ammonia. In its broadest aspects this process is concerned with the separation of carbon dioxide from ammonia down to a few parts per million. In one of its narrower aspects the process is based on the removal of the carbon dioxide from the ammonia and other gases, if present, by scrubbing the feed gas with an aqueous solution of a weak base capable of reversible combination with carbon dioxide followed by the final step of removing the carbon dioxide impurity from the ammonia. A wide variety of weak bases such as sodium carbonate, potassium carbonate, water soluble amines and the like are known to be suitable for carbon dioxide absorption, and may be used, but the preferred class are the water-soluble alkylolamines such as the mono-, di- and triethanolamines, propanolamines and the like. It is understood that the preferred ammonia-carbon dioxide separation process employing these amines follows that described and claimed in U.S. Patent 2,785,045, dated March 12, 1957.

Whenever ammonia is cooled and compressed it is imperative that the remaining carbon dioxide be removed prior to these operations because if present in ammonia solid ammonium carbamate is formed. This compound is a source of considerable trouble whenever encountered in plant operation. If the temperature and pressure conditions are right the carbon dioxide reacts with ammonia to deposit solid ammonium carbamate to plug lines and valves. Furthermore, the grains of ammonium carbamate if present in the ammonia being compressed will scour the cylinder walls of the compressor.

It has been found that although a substantially complete separation of carbon dioxide from mixtures thereof with ammonia can be obtained by a combined absorption and partial stripping of the aqueous absorbing solution as in the patented process referred to above, there will remain in the ammonia off-gas up to 25 or more parts per million of carbon dioxide. In the past this remaining amount of carbon dioxide has been removed by a caustic scrubbing, preferably with a solution of sodium hydroxide. However, this method of final scrubbing is in some ways objectionable because there is a loss of product ammonia gas. Furthermore, some reagent is lost by combining with carbon dioxide since regeneration of the product is often more expensive than the use of fresh reagent.

In the preferred practice of this invention the enriched solvent from the absorbing stage in the solution scrubbing of ammonia-carbon dioxide gas mixtures is subjected to an initial heating, the extent of which is limited to that necessary to strip out or drive off the dissolved ammonia without, however, liberating more than a minor proportion of the absorbed carbon dioxide. The gases so liberated are returned to the absorption stage, thus preventing any substantial loss of ammonia from the gases undergoing treatment. The partially stripped enriched solvent is then further heated in a regenerating stage, with the result that most of its combined carbon dioxide is liberated as a substantially ammonia-free carbon dioxide gas, after which the regenerated solvent is cooled and returned to the absorption stage. The ammonia gas product after removal of carbon dioxide is then passed through an absorbent bed of molecular sieve material composed of an activated zeolitic compound which contains voids having the minimum dimensions not less than about 4.0 angstrom units. Preferably, the smallest dimension should be about 5 angstrom units.

The equilibrium data for carbon dioxide and ammonia adsorption on molecular sieve material indicate that at the condition of operation described above the equilibrium adsorption capacity for ammonia is 0.15 lb. of ammonia per pound of molecular sieve, whereas the equilibrium of adsorption capacity of carbon dioxide is 0.005 lb. of carbon dioxide per pound of molecular sieve. It has been discovered that it is possible to preferentially adsorb carbon dioxide from ammonia gas, thus stripping the latter to less than 2 parts per million by volume of carbon dioxide even though the equilibrium capacity for carbon dioxide seems much lower than that of ammonia. Another surprising feature of this invention is that it was found that the presence of ammonia in the gas enhances the adsorption capacity of the molecular sieve for carbon dioxide several times. In fact the capacity for carbon dioxide adsorption was found to be enhanced 2–3 times of that indicated by the equilibrium data. Actual dynamic adsorption capacities of carbon dioxide in the presence of large amounts of ammonia have been found to be 0.013 pound of carbon dioxide per pound of molecular sieve. Evidently the presence of ammonia at the conditions described exerts a synergistic effect over the adsorption of carbon dioxide. These high values were obtained even with the sieve loaded with up to 0.2–0.25 pound of water per pound of sieve. It was also found that no plugging due to any compound formation had incurred. The molecular sieve bed was easy to regenerate and the adsorption was repeated without significant lessening of its capacity.

It is the principal object of this invention to remove practically all of the carbon dioxide which remains in gaseous ammonia after a preliminary scrubbing to remove a major portion of the carbon dioxide down to about 25 parts per million. It is a further object of this invention to remove both the residual carbon dioxide and water vapor from an ammonia gas by passing the impure ammonia through an activated zeolitic material having voids whose narrowest dimension is at least about 4.0 angstrom units. Other objects and improvements will become apparent in the further discussion of the invention set forth hereinafter.

The invention will be described in greater detail with reference to the accompanying drawing wherein the single figure is a flow diagram of a preferred embodiment thereof. In this flow sheet the items of equipment are indicated more or less diagrammatically, it being understood that any preferred equipment may be used for the purpose indicated.

Referring to the drawing, reference number 1 indicates generally a carbon dioxide absorber wherein the feed gas may be scrubbed with a cooled aqueous carbon dioxide absorbing agent which is preferably an alkylolamine solvent. The absorber may be a packed tower, a bubble plate column, a gas washer or any other suitable form of gas and liquid contact apparatus that is preferably provided with internal or external cooling coils for removing heat generated by the carbon dioxide absorption. The absorber 1 is operated in combination with a stripping column 2 which may be a separate column, as shown, or may be a lower extension of the carbon dioxide absorber 1. A suitable heater 3 is provided in or adjacent the base of the stripping column 2 in order to impart an initial limited heating to the enriched solvent, and downflow and upflow lines 4 and 5 are provided if two separate columns are used. The feed gas, containing both carbon dioxide and ammonia, may be introduced in the up-flow line 5 as indicated by the arrow, or it may be introduced directly into the base of the column 1.

The off-gas from column 1 is then passed through line to adsorption equipment which contains beds of adsorptive material. Here the carbon dioxide is preferentially adsorbed on a molecular sieve comprising a zeolitic mineral either natural or synthetic, which initially has been dehydrated by heating to temperatures of approximately 650° F. to drive off the water of crystallization. The dehydration treatment leaves the zeolite with approximately the same crystalline structure as the original zeolite. There is a slight shrinkage of the crystalline structure of the zeolite molecule when water is driven off during heating of the preferred zeolites, but in any event there remains an interstitial void within the molecule which will vary in dimension according to the original crystalline structure of the hydrous zeolite. These voids should have at the narrowest dimension of the void an opening of at least about 4.0 angstrom units and for a process such as described herein, an opening of 5 angstroms is preferred. It has been ascertained that the best zeolitic material for separation of impurities from ammonia, according to this invention, should have a crystal structure approximately that of chabazite, which is a calcium zeolite with an opening of about 5 angstrom units. While these are the preferred types of zeolitic minerals to be used as adsorbents in this process, other natural or synthetic zeolites may be employed in the process of this invention if they maintain their crystalline structure on dehydration at 650° F. and the narrowest dimension of the interstitial voids is at least about 4 angstrom units and preferably 5 angstrom units. Fibrouszeolites similar to natrolite have not been found useful since the crystal lattice collapses on heating to dehydration temperatures. Dehydration of the zeolites can be carried out at temperatures as high as about 880° F. but the preferred practice in preparing the natural or synthetic zeolite as an adsorbent is to heat the mineral to about 650° F. Dehydration is facilitated by heating the hydrated material in the presence of a vacuum or a low humidity gas.

In operation the feed gas is scrubbed with cooled aqueous alkylolamine solvent in the tower 1, whereby substantially all of its carbon dioxide content is absorbed with concomitant solution of ammonia in the solvent. The enriched solvent passes downwardly through line 4 into the stripping column 2 wherein it is subjected to an initial limited heating. This heating is carried out only to the extent necessary to drive off the dissolved ammonia which, with a small part of the carbon dioxide that is also unavoidably evolved, is recirculated back to the absorption column through line 5. It will be seen, therefore, that when steady conditions are attained the ammonia dissolved in the absorption column 1 is liberated in the stripping column 2 and reintroduced into the absorber so that there is substantially no net loss of ammonia from the gases being processed. These gases, substantially free from carbon dioxide, are withdrawn from the column 1 through line 7 and after being washed with aqueous alkali, if necessary, are obtained in a carbon dioxide-free condition. The ammonia gases so purified may be converted into liquid ammonia, either by direct condensation or after compressing without interference from the plugging of condensers or pipes due to ammonium carbonate or ammonium carbamate formation.

The carbon dioxide removed from the gases in the absorber 1 and contained in the enriched solvent leaving the base of the stripping column 2 is recovered by subjecting the enriched solvent to a second and more extensive heating in a regenerating stage. For this purpose a stream of the enriched solvent is withdrawn from column 2 through lines 6 and 15 and passed through heat exchanger 16 and line 17 into a regenerating tower or column 18 which may be a fractionating column provided with packing or with bubble plates or other contact means. The column 18 is provided with a reboiler or other heating means 19, which is preferably a tubular heater in which high pressure steam is condensed around the heating tubes. The solvent flowing downwardly from the base of the tower through line 20 is split and a portion flows through the tubes of the heater 19 to be returned to the stripper 18 through line 21. A tubular condenser 22, supplied with cooling water, receives the gases and vapors leaving the top of the regenerating column through line 23 and a part of the condensate draining therefrom through line 24 is returned to the column 18 as reflux, the remainder being discarded. A stream of substantially pure carbon dioxide, containing little or no ammonia, is drawn off from the top of the condenser through line 25.

The regenerated or lean solvent solution is withdrawn from the column 18 through line 26, which preferably connects with line 20, and is passed through the outer portion of heat exchanger 16 to assist in heating the enriched solvent entering from line 15. The lean solvent leaves the heat exchanger 16 through line 27 and is further cooled in a cooler 28 by indirect heat exchange with cooling water, after which it passes through line 29 into a storage tank or surge tank 30. From this tank a stream of the solvent is continuously passed by way of line 31, pump 32, cooler 33 and line 34 into the top of the absorption tower 1 for reuse in purifying further quantities of feed gas.

It will be seen from the foregoing description that the stream of aqueous alkylolamine solvent is recirculated continuously through an absorption stage, an ammonia stripping stage wherein it is partially heated, a regenerating stage where it is further heated, and a cooling stage which may comprise several successive cooling steps. Experience has shown that this repeated heating and cooling of the solvent may cause decomposition products to form therein. In order to offset this degradation, a small side stream of the regenerated or lean solvent may be taken off from line 26 through line 35 and passed into an amine purifier 36 which is a still in which the amine is distilled in the presence of sodium hydroxide or other alkali. The resulting vapors of purified alkylolamine and water are passed through line 37 into a condenser 38 and the condensed alkylolamine is returned to the remainder of the solvent by pump 39 and line 40. The solvent may be further protected against decomposition, if desired, by adding small quantities of a known or preferred inhibitor such as copper iodide, vanadium compounds and the like. A water solution of such an inhibitor may be maintained, for example, in a tank 41 and introduced continuously in small amounts into the recirculating solvent through line 42.

The gaseous ammonia leaving the top of the absorption column 1 after treatment with the monoethanolamine solution contains from about 25–50 parts per million by volume of carbon dioxide. To remove this amount of carbon dioxide down to 2 parts per million or less, the gas flowing through the line 7 is preferably passed through a cooler 8 to reduce the temperature to around 40–60° F. Cooling will reduce the amount of water contained in the effluent gas. In an alternate method the gas leaving the column 1 can be cooled with cooling water to 100° F. and the resulting gas sent through an adsorber containing a mixed bed of a dehydrating agent such as alumina, silica gel and the like, followed by a molecular sieve bed. By such a modification, the primary dehydrating agent such as alumina removes the major portion of the water loading of the gas and only a small bed of molecular sieve is required to remove impurities like carbon dioxide. This modification eliminates the need for expensive refrigeration facilities and thus makes the process more economical.

The gas leaving the cooler 8 flows through the line 9 to the adsorption vessels 10 and 11 which may contain a bed of molecular sieve or optionally a bed of some desiccant activated alumina or silica gel, as a lower layer followed by an upper layer of molecular sieve as shown in the figure. According to the figure, the upper beds 51 and 52 will contain a molecular sieve which has been described above. The lower layers 53 and 54 contain the desiccant which will remove practically all of the water vapor from the incoming gas prior to the contact of said gas with a molecular sieve which is an avid adsorbent for water. By appropriate means well known in the art of treating gases, the valves 55 and 56 are so manipulated as to direct the flow of the ammonia, plus water vapor and carbon dioxide through the proper regenerated adsorbent bed. The illustration cited above describes the mixed bed operation but the process can be successfully operated with cooler gas being sent through a bed consisting of a molecular sieve only.

After having passed through the adsorbent bed until such time as the carbon dioxide reaches the breakthrough point the ammonia gas then flows through the line 61 and out to a storage or further use through the valve 62. This valve is so adjusted as to direct a prescribed amount of ammonia through the heater 64 where the temperature of the ammonia gas is raised to about 400° F. Thereafter by proper manipulation of valves 67 and 68 the heated gas is used to regenerate the remaining adsorbent bed while the adsorption operation is being accomplished in the companion adsorbent bed. Only part of the heat necessary for regeneration is supplied by hot ammonia being recycled through the heater 64. The remainder of the heat required for regeneration is supplied by heating coils embedded in the adsorbent. The heat to be transmitted through the walls of the coil may be furnished by any conventional means; such as a heating medium flowing through the coils or an electrical heating unit. Since the molecular sieve simultaneously dehydrates the gas to a very low dew-point as it purifies the gas, the product gas obtained will be practically dry. If a portion of such a dry product gas was used for the regeneration of the molecular sieve bed, the temperature needed for regeneration can be considerably lowered, since regeneration is effective at lower temperatures with a dryer gas.

During the regeneration operation the ammonia and carbon dioxide, as well as water vapor that has been adsorbed onto the molecular sieve is driven off and returned through the line 69 back to the absorption column 1. By this action no ammonia is lost since all of the gas from the regeneration operation is led back into the system rather than being vented to the atmosphere. Considerable savings are made by this improvement in the treatment of ammonia and carbon dioxide gases because even if negligible amounts of ammonia were absorbed along with the carbon dioxide the loss would amount to a substantial sum in the course of a year's time. Through this improvement there is no venting of any gases to the atmosphere before the final carbon dioxide is removed from the ammonia. Another feature of this total recycle regeneration system is that the heat liberated on a fresh molecular sieve bed by ammonia adsorption is eliminated. If any other inert gas were used for regeneration, then the unit has to be purged with ammonia before use.

After regeneration the purified ammonia flowing through valve 63 is permitted to bypass the heater 64 to thereafter flow into the regenerated bed and cool said bed down to a temperature preparatory to a subsequent adsorption operation. The figure shows the flow of the cooling gas back to the absorption column 1 through the line 69. As this cooling gas represents only about 1–5% of the total gas flowing through line 61, the return of this ammonia into the system would not be of such an economic loss as to preclude its return into the absorption column in a small plant. However, for large scale plants handling about 100 tons of ammonia gas per day or over, some provision could be made to return the cooling gas back into the line carrying purified ammonia at some point in the line after valve 62. While the figure shows the heater 64 in the line directing the return of purified ammonia into the adsorbent beds for regeneration, it is also contemplated as part of the invention that the use of the heater 64 may be completely avoided by placing heating coils in the adsorbent beds to transmit heat thereto during regeneration.

In the mixed bed adsorption system it was found that the regeneration gas should be passed countercurrently to the adsorption flow scheme and also that the hot gas should first contact the molecular sieve bed of the system and next flow over the alumina type dehydrating agent. This is necessitated by the fact that an alumina type desiccant is limited to a temperature of up to 500° F. and this scheme avoids the superheating of the alumina, thereby sintering it. Fortuitously, the above mentioned scheme which used dry product gas for regeneration allows the regeneration of the molecular sieve bed at temperatures as low as 400–500° F.

The invention has been described and illustrated above when two adsorbent beds are employed for the steps of adsorption, regeneration and cooling. However, it is within the purview of the applicants' invention that a single bed be used with intermittent adsorption, regeneration and cooling steps and ammonia being supplied from storage for regeneration and cooling. A more effective scheme would be the use of three separate beds in which the adsorption, regeneration and cooling operations can be accomplished simultaneously by appropriate piping and valves.

The invention will be further illustrated by the following specific example. It will be understood, however, that although this example may describe some of the preferred features of the invention, including specific beds, concentrations of gases entering the adsorbent vessels and operating temperatures, these features are given primarily for purposes of illustration and that modifications and substitutions may be resorted to within the scope of the appended claims.

*Example*

Two adsorbent vessels were established, each containing three foot deep beds of activated alumina and an overlaying bed of a molecular sieve which is approximately two feet in depth. This bed of molecular sieve was made up of a synthetic zeolite which had been heated to about 650° F. to drive off the water of crystallization and leave the zeolitic material with voids having the smallest dimension of at least 5 angstrom units. The ammonia gas containing 68 parts per million of carbon dioxide and 1% water was introduced into this bed maintained at a temperature of 60° F. Most of the water vapor was adsorbed by the alumina bed and the remaining water, plus the carbon dioxide content, was adsorbed in the zeolitic bed. Adsorption continued for 4 hours until the carbon dioxide started to break through the zeolitic bed as indicated by an infra-red analyzer. When the carbon dioxide began to break through the zeolitic bed the valve permitting the flow of gases into the bed was closed and thereafter gases were permitted to flow through the second adsorbent bed. While the second stage of adsorption was being accomplished a portion of the purified ammonia was heated to approximately 400° F. and allow to flow countercurrently through the first bed in order to drive off the carbon dioxide, ammonia and water vapor from both the zeolitic and alumina beds. This regeneration process was allowed to continue for approximately 2½ hours, at which time the bed was completely regenerated. Thereafter cool purified ammonia was allowed to flow countercurrently through the regenerated bed for 1½ hours to lower the temperature of the bed down to that appropriate for subsequent adsorption operation. The ammonia flowing out the line 61 and through valve 62 contained 2 parts per million of carbon dioxide and also had a low dew-point.

What is claimed is:

1. The method of removing carbon dioxide from a mixture of ammonia and carbon dioxide in which the carbon dioxide is present therein in an amount in excess of 2 parts per million by volume but not greater than 50 parts per million by volume, which comprises passing said gas mixture through a molecular sieve comprising a bed of activated zeolite having voids whose narrowest dimension is at least 4 angstrom units in length to preferentially adsorb the carbon dioxide, continuing adsorption until the carbon dioxide reaches the break through point, heating the zeolite bed by indirect heating means in addition to a countercurrent flow of a portion of the purified ammonia which has been heated to regenerate the zeolitic adsorbent bed, thereafter cooling the adsorbent bed with a cool carbon dioxide-free ammonia gas.

2. The method according to claim 1 in which two (2) zeolitic adsorbent beds are used simultaneously wherein one bed is used for adsorption while the remaining bed is being regenerated and cooled.

3. The method according to claim 1 in which the adsorbent beds comprise a series of beds with a dehydrating material used in the bed which is first contacted by impure gas, followed by second bed of the activated zeolitic material.

4. A method according to claim 1 in which the narrowest dimension of the voids in the zeolitic adsorbent is at least 5 angstrom units.

5. A method of separating carbon dioxide from gaseous mixture of ammonia and carbon dioxide which comprises first separating out the carbon dioxide to the extent that no more than 50 parts per million by volume of carbon dioxide remains in the ammonia, thereafter contacting said gas mixture with a reduced amount of carbon dioxide through a molecular sieve comprising a bed of activated zeolite having voids whose narrowest dimension is at least 4 angstrom units in length, to preferentially adsorb the carbon dioxide, continuing adsorption until the carbon dioxide reaches the breakthrough point, heating the zeolitic bed by indirect heating means and in addition flowing a heated portion of the purified ammonia through the zeolitic adsorbent bed in a manner countercurrent to the direction of the flow of gas during adsorption, and thereafter cooling said adsorbent bed with cool carbon dioxide-free ammonia gas.

6. The method according to claim 5 in which the ammonia used for heating and cooling is returned to the first carbon dioxide separation step.

References Cited in the file of this patent

UNITED STATES PATENTS

| 2,747,681 | Schuftan et al. | May 29, 1956 |
| 2,785,045 | Wan et al. | Mar. 12, 1957 |
| 2,818,137 | Richmond et al. | Dec. 31, 1957 |
| 2,847,361 | Hengstenbeck | Aug. 12, 1958 |
| 2,882,243 | Milton | Apr. 14, 1959 |

OTHER REFERENCES

Breck et al.: J.A.C.S., vol. 78, No. 23, December 8, 1956, pages 5963–5971. (Copy in Scientific Library.)